United States Patent [19]

Minor

[11] Patent Number: 4,537,180

[45] Date of Patent: Aug. 27, 1985

[54] SOLAR HEATING AND STORAGE UNIT

[76] Inventor: John W. Minor, 173 Dolphin Ave. SE., St. Petersburg, Fla. 33705

[21] Appl. No.: 642,751

[22] Filed: Aug. 21, 1984

Related U.S. Application Data

[63] Continuation of Ser. No. 313,270, Oct. 21, 1981, abandoned.

[51] Int. Cl.$^3$ ................................................ F24J 3/02
[52] U.S. Cl. ..................................... 126/437; 126/450
[58] Field of Search ............... 126/450, 449, 437, 418, 126/443, 426

[56] References Cited

U.S. PATENT DOCUMENTS

| | | | |
|---|---|---|---|
| 1,093,498 | 4/1914 | Thring | 126/271 |
| 1,575,309 | 3/1926 | Anderson | 126/438 |
| 2,167,576 | 7/1939 | Kiser | 126/443 |
| 2,213,894 | 9/1940 | Barry | 126/443 |
| 2,388,940 | 11/1945 | Taylor . | |
| 3,587,559 | 6/1971 | Nonaka | 126/440 |
| 4,056,093 | 11/1977 | Barger | 126/271 |
| 4,057,048 | 11/1977 | Maine | 126/440 |
| 4,116,223 | 9/1978 | Vacilantone | 126/271 |
| 4,236,507 | 12/1980 | Vincent | 126/450 |
| 4,256,092 | 3/1981 | Gutermuth et al. | 126/449 |
| 4,344,418 | 8/1982 | Leroy | 126/450 |
| 4,346,696 | 8/1982 | Brunet | 126/450 |

FOREIGN PATENT DOCUMENTS

| | | |
|---|---|---|
| 2923289 | 12/1980 | Fed. Rep. of Germany . |
| 8005132 | 11/1980 | France . |
| 2459948 | 1/1981 | France . |
| 2468077 | 4/1981 | France ............................. 126/437 |
| 2923289 | 12/1980 | Fed. Rep. of Germany . |

*Primary Examiner*—Carroll B. Dority, Jr.
*Attorney, Agent, or Firm*—Woodcock, Washburn, Kurtz, Mackiewicz & Norris

[57] ABSTRACT

A hemispherically shaped solar heater and storage unit comprises an insulated base, a hemispherically shaped inner dome having a surface capable of absorbing solar energy, and attached to the base to form a reservoir capable of withstanding a preselected pressure, a substantially transparent hemispherically shaped outer dome having a diameter larger than the inner dome and positioned over the inner dome, means for introducing a fluid under pressure into the bottom area of the reservoir, a diffuser for introducing the fluid into the reservoir without substantially disturbing the fluid at the top of the reservoir, and means for removing heated fluid from the top of the reservoir.

12 Claims, 7 Drawing Figures

SOLAR HEATING AND STORAGE UNIT

This is a continuation of application Ser. No. 313,270, filed Oct. 21, 1981 and now abandoned.

The invention relates to a solar device for the heating and storing of a heat absorbing fluid such as water and more particularly to a hemispherically shaped unit which retains thermal energy with minimal thermal loss. The solar heater and storage unit of this invention is adaptable for use in series with a domestic hot water system.

BACKGROUND AND OBJECTS OF THE INVENTION

A variety of solar devices have been proposed, many of which have flat plate collectors that require pumps, electronic controls, and additional water storage which may include increasing the capacity of conventional electrical heaters used as part of a hot water system. The efficiency of such flat plate systems may also be affected by the angle at which the sun hits the plate. Thus, the plate may have to be mechanically or manually turned to obtain full exposure to the sun's rays. Attempts have been made to overcome this angle orientation problem.

U.S. Pat. No. 4,256,092 to Gutermuth et al. shows a solar radiation converter which includes a black insulated housing with a front glass wall and a plurality of blackened rotationally symmetrical balls or cylinders pivotally disposed within the housing as absorber elements and turned by a flowing heat transfer medium such as water.

U.S. Pat. No. 3,587,559 to Nonaka teaches an apparatus for heating water by solar rays comprising a plurality of spherical lenses positioned in a box covered by glass at the side facing the sun, a plurality of heat collecting members each positioned below each of the spherical lenses, each of the heat collecting members being lined with a superheat resisting carbon impregnated cloth at the area subjected to focused rays, and a continuous water pipe extending in a number of convolutions within the box.

U.S. Pat. No. 4,056,093 to Barger discloses a solar heating unit including an upwardly opening generally hemispherical double wall boiler including spaced inner and outer hemispherical walls defining a closed chamber therebetween in which to receive a liquid to be heated. An upwardly convex spherical lens structure is supported over the boiler and comprises a closure for the area enclosed within the boundaries of the inner hemispherical wall of the boiler and the lens assembly or structure functions to direct light rays incident thereon onto the inner wall of the boiler. The solar heater additionally includes a hollow downwardly opening transparent hemispherical cover of generally the same radius of curvature as the boiler and which is secured over the lens assembly in outwardly spaced position relative thereto with the center of curvature of the cover substantially coinciding with the center of curvature of the lens assembly. Water or other liquid inlet and outlet structure is provided on a second form of the invention for admitting liquid to be heated into the interior of the boiler between the inner and outer plates thereof and for withdrawing heated liquid from within the boiler.

U.S. Pat. No. 4,057,048 to Maine discloses a solar heat-collecting structure comprising a series of interconnected transparent lenses forming a dome-shaped roof for receiving direct solar radiation and for transmitting such radiation through the lenses into the enclosure formed thereby and focusing it onto a shallow tray of water forming a floor of the enclosure.

U.S. Pat. No. 4,116,223 to Vasilantone teaches a solar energy unit comprising a housing adapted to be mounted on the roof of a building or otherwise suitably supported. The housing has a central cavity which contains a reservoir for a heat absorbing liquid. A heat exchanger containing a circulating heat exchange fluid is immersed in the heat-absorbing liquid. The heat exchange fluid circulates to areas to be heated. A substantially hemispherical and transparent dome covers the upper end of the housing and the cavity and is provided with prismatic facets on its inner surface to magnify the sun's rays and to focus or concentrate the rays on the heat-absorbing liquid.

U.S. Pat. No. 4,236,507 to Vincent teaches a solar heater for air. The solar heater has a shape like a dome with a transparent outer cover and transparent inner cover. A dead air layer is inbetween covers. Inside the dome is a collector that holds up the covers and converts the solar rays to heat. Air or gas is circulated through the solar heater from an input pipe on one side to an output pipe on the other side, obtaining heat from the collector and base by conduction and radiation.

There is thus a need for a unified solar heater and storage system which can function as a passive system without the requirements of pumps and/or expensive electronics, and which is adaptable for use with a domestic hot water system.

It is, therefore, an object of the present invention to provide a unitary solar heating and storage unit capable of providing hot water for home and/or industrial use.

It is a further object of this invention to provide a solar heating and storage unit which does not have to be adjusted to any change in the angle of exposure to the sun.

It is yet another object of this invention to provide a solar heater and storage unit which minimizes heat loss to the atmosphere.

It is a further object of this invention to provide a solar unit which will reduce the cost of using solar energy.

SUMMARY OF THE INVENTION

The solar heater and storage unit of this invention comprises an insulated base structure, a hemispherically shaped inner dome having a surface capable of absorbing solar energy and attached to the base to form a reservoir capable of withstanding a preselected pressure, a substantially transparent hemispherically shaped outer dome having a diameter larger than the inner dome and positioned over the inner dome, means for introducing a fluid under pressure into the bottom area of the reservoir, a diffuser for introducing the fluid into the reservoir without substantially disturbing the fluid at the top of the reservoir, and means for removing heated fluid under pressure from the top of the reservoir. Preferably at least one excess pressure relief means is also included. Additionally other pressure regulating means may also be employed. In operation solar energy is transmitted through the outer dome and absorbed by the surface of the inner dome. This process heats water which has been introduced into the reservoir. The hotter water rises to the top of the reservoir where it may be withdrawn on a demand basis.

DETAILED DESCRIPTION OF THE DRAWINGS

Figure 1:
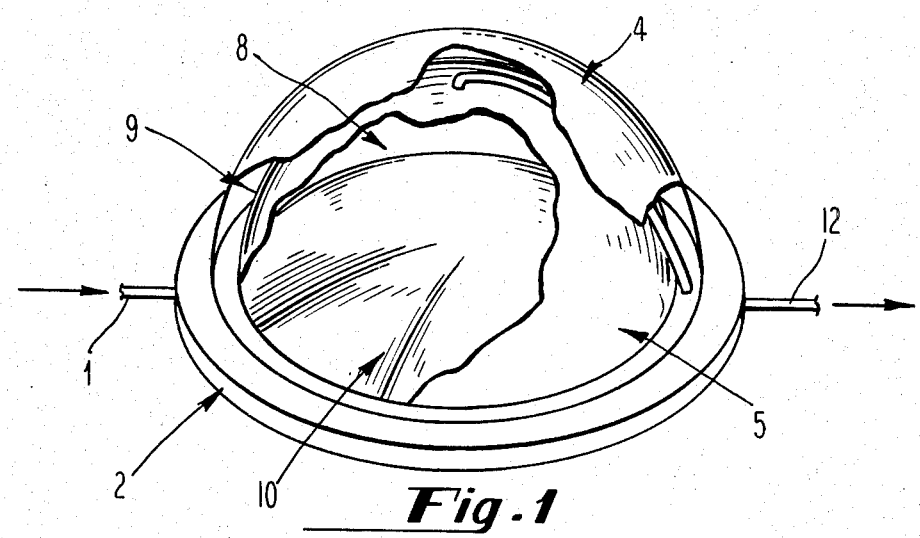
FIG. 1 is a general perspective view of a solar heater and storage apparatus constructed in accordance with this invention, with portions of the outer and inner domes cut away.

FIG. 1 is a general perspective view of a solar heater and storage unit constructed in accordance with this invention and shows the overall hemispheric shape of the unit. The interior of the unit comprises an insulated base 2 with a bottom 10 over which is positioned a hemispherically shaped inner dome 5 to form a reservoir area 8. Inner dome 5 has a surface 6 adapted for absorbing solar energy (e.g. dark colored paint) and is attached (e.g. welding or gluing) to insulated base 2 so as to form a substantially water tight seal. Optionally a gasket may be used to achieve a good seal. A hemispherically shaped outer dome 4 having a diameter larger than inner dome 5 is positioned over the interior structure thereby creating a gap 9 between the two domes. This gap may contain air or be partially evacuated. An inlet 1 is positioned in base 2 for introducing water into reservoir 8. As the sun's light and energy passes through the substantially transparent outer dome 5, the solar radiation is absorbed by the surface of inner dome 5 and heats the water contained in reservoir 8. The hotter water rises to the top of reservoir 8 by a convection process and may be removed on demand through exit means 12 which has one end positioned proximate to the top of reservoir 8 through inner dome 5 and the other end vented into an end system or collector, e.g. a domestic heating system. A major portion of exit line 12 is preferably positioned within gap 9 so as to take advantage of this insulating area.

Figure 2:
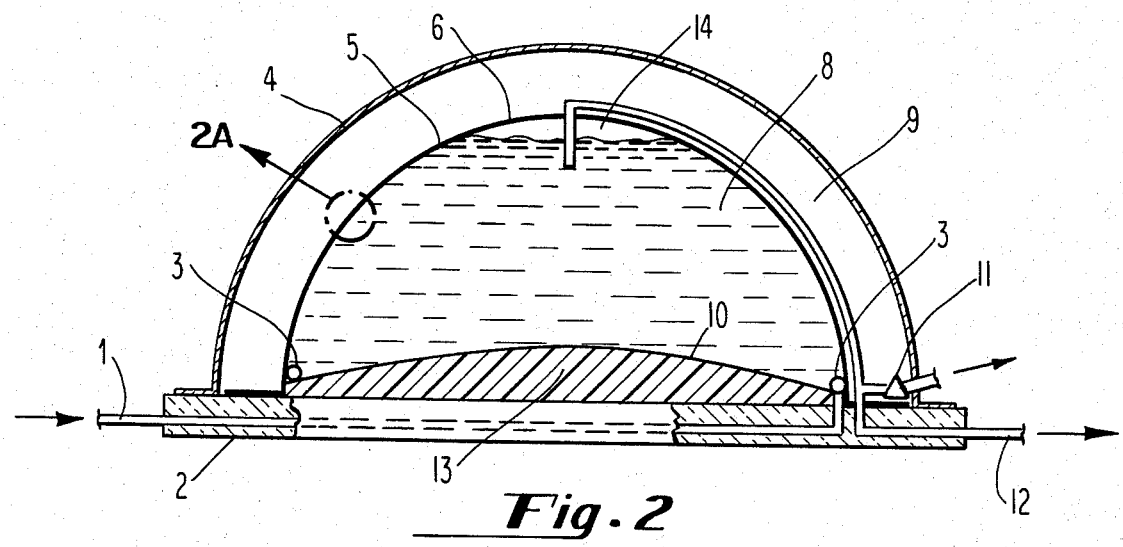
FIG. 2 is a sectional view of a solar heating and storage unit constructed in accordance with this invention.

FIG. 2 is a sectional view of one embodiment of a solar heater and storage unit constructed in accordance with this invention. The insulated base 2 is shown with bottom 10 over an insulating layer 13, e.g. foam. Inlet 1 is positioned in base 2 and attached to a diffuser 3. In this embodiment diffuser 3 may be a perforated pipe positioned around the interior circumference of bottom 10. Preferably the perforations in the pipe are positioned to allow water to enter reservoir 8 at proper angles and without displacing the hot water at the top of the reservoir 8. The diffuser reduces turbulance which may result from introducing cold water into reservoir 8. FIG. 2 shows reservoir 8 with an air gap 14 at the top to allow for expansion upon the heating of the water. Exit means 12, e.g. a pipe, is positioned below the surface of the water. A safety feature in the form of a relief valve 11 is positioned in exit line 12 so that excess pressure and/or heated water may be released. Relief valve 11 may be vented to the atmosphere.

Figure 2A:
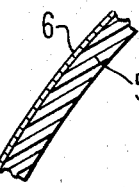
FIG. 2a is an enlarged fragmentary view of a section of the inner dome.

FIG. 2a shows an enlarged fragmentary section of the inner dome 5 and shows a solar energy absorbing surface 6.

Figure 3:
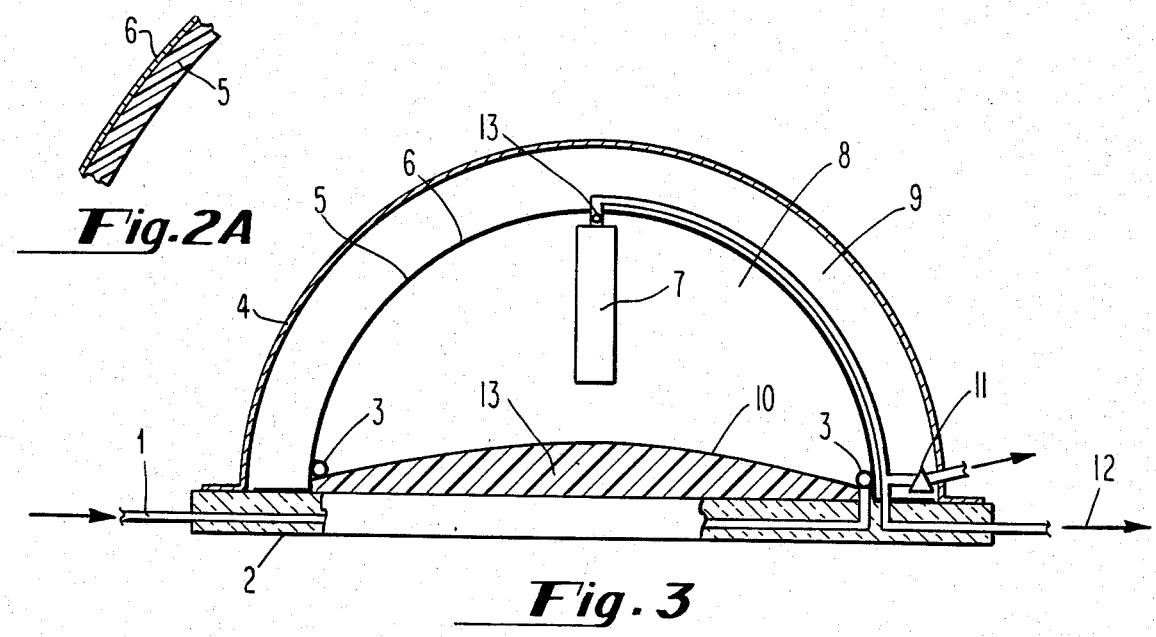
FIG. 3 is a sectional view of an alternate embodiment of the invention containing a water expansion accumulator.

FIG. 3 shows an alternate embodiment of the invention which includes a water expansion accumulator 7. The accumulator 7 is closed at the top end and initially contains air. Upon expansion of the water contained in reservoir 8, the water may compress the air contained in accumulator 7 to accommodate this expansion. Accumulator 7 may be suspended in reservoir 8 by means of attachment to one end of exit pipe 12. In this embodiment the end of exit pipe 12 which is attached to accumulator 7 which pipe has at least one substantial perforation 13 therethrough to allow the heated water to exit through the exit pipe 12.

Figure 4:
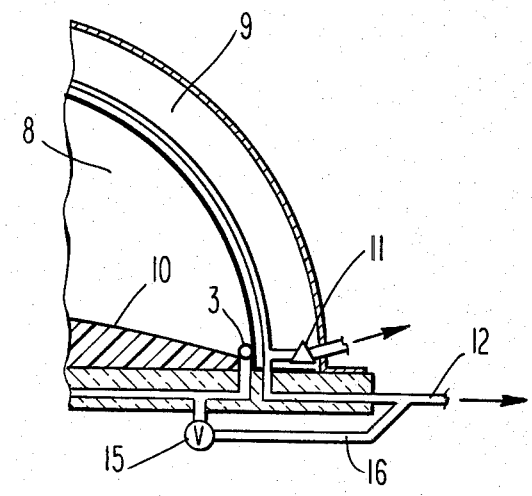
FIG. 4 is a fragmentary view of an embodiment of the invention containing a pressure valve positioned in the cold water line and vented into the hot water exit line.

FIG. 4 is a fragmentary view of a pressure releasing means located within the inlet line 1. This pressure releasing means is a valve switch 15 set at a preselected pressure. If the inlet water exceeds this pressure, water is vented by means of line 16 into the hot water exit 12 until the pressure falls below the preselected limit.

Figure 5:
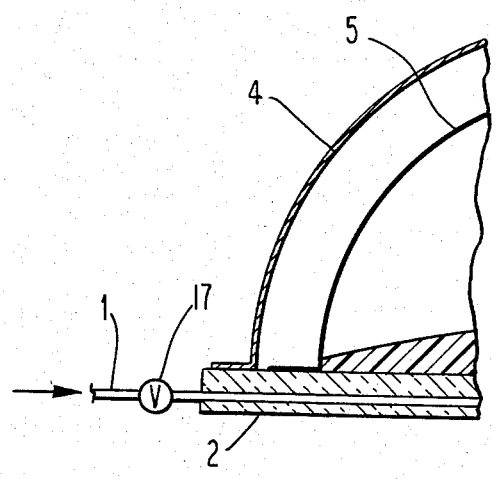
FIG. 5 is a fragmentary section showing an alternative pressure control means positioned in the cold water line to regulate the pressure of the cold water as it enters the unit.

FIG. 5 shows an alternative pressure regulating means in the form of a series valve impedence 17. This impedence may be used to regulate the pressure of the fluid before it enters the reservoir 8, and is preferably positioned proximate to where the source of fluid, e.g. cold water, is attached to cold water line 1, but before the cold water enters the unit.

Figure 6:
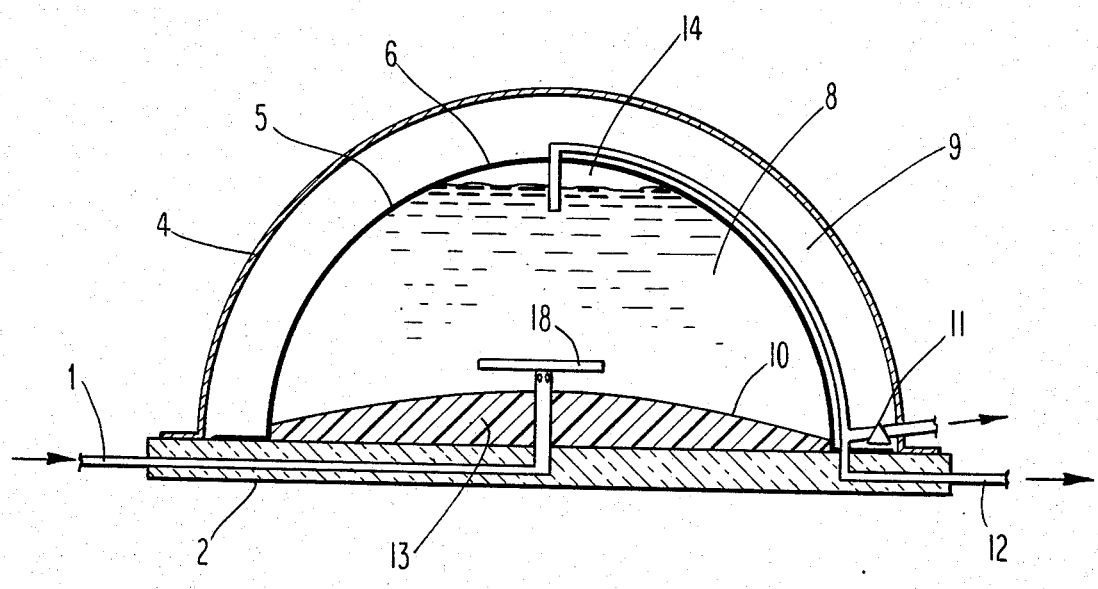
FIG. 6 is a sectional view of another embodiment of this invention in which a diffusion plate is used as the diffuser.

FIG. 6 shows another embodiment comprising an alternative diffuser. The alternative diffuser structure is shown as a plate 18 under which the cold water from line 1 enters reservoir 8 through perforations 19 in line 1 and is deflected off of the bottom of plate 18.

The hemispheric shape of the unit provides optimum strength and volume as well as maximizing the absorption of solar energy.

The solar heater and storage unit of this invention may be constructed from a variety of materials and in a variety of sizes. As previously explained the inner dome 5 is attached to bottom 10 to form a reservoir 8. The inner dome and bottom may be made from metal or plastic depending on the pressure which the system must withstand. Due to safety codes, a system usually must be made to withstand pressures of about 160 lb/in$^2$. When pressure regulating means such as those shown in FIGS. 4 or 5 are used, a lower pressure may be selected (e.g. 80 lb/in$^2$) and maintained, thus allowing manufacturing costs to be decreased without sacrificing safety requirements. Means of attaching various components to each other may include welding and/or gluing.

The unit may be constructed in a variety of dimensions. For a domestic unit a capacity of about 165 gallons for the reservoir is preferred. It is preferred that the gap 9 between the domes be about 7 inches in a unit of this size.

The solar heater and storage collector may be mounted on a dirt embankment and connected to supply domestic hot water needs such as for heating or bathing. It is a passive apparatus and needs no support pumps or electronic components.

The embodiments described herein are merely illustrative of the invention. Numerous modifications including various combinations of the above described structures will readily occur to those skilled in the art. Thus other modifications and changes may be made which are within the spirit and scope of the invention.

I claim:

1. A solar heater and storage unit comprising:
   an insulated base structure,
   a hemispherically shaped inner dome having a surface capable of absorbing solar energy and attached to said base to form a reservoir capable of withstanding a preselected pressure,
   a substantially transparent hemispherically shaped outer dome having a diameter larger than said inner dome and positioned over said inner dome,
   means for introducing a fluid under pressure into the bottom area of said reservoir,
   a diffuser, said fluid being introduced into said reservoir through said diffuser without disturbing the fluid at the top of said reservoir, and
   exit means for removing heated fluid under said pressure from the top of said reservoir.

2. The solar heater and storage unit of claim 1 wherein said fluid is water.

3. The solar heater and storage unit of claim 1 wherein said insulated base comprises a metallic bottom positioned over insulation.

4. The solar heater and storage unit of claim 1 wherein said diffuser comprises a perforated pipe positioned at about the bottom area of said reservoir and proximate to the interior circumferential edge of said base.

5. The solar heater and storage unit of claim 1 which additionally comprises a pressure regulating means.

6. The solar heater and storage unit of claim 5 wherein said pressure regulating means comprises a relief valve positioned in said exit means.

7. The solar heater and storage unit of claim 5 wherein said pressure regulating means comprises a series valve impedence structure.

8. The solar heater and storage unit of claim 5 wherein said pressure regulating means comprises a pressure valve positioned in said introducing means and vented into said exit means.

9. The solar heater and storage unit of claim 1 wherein said introducing means is a pipe.

10. A method for heating water comprising:
    introducing water under pressure into a solar heater and storage unit through an insulated base structure, said unit having a hemispherically shaped inner dome positioned on said base with a substantially watertight seal to form a reservoir, said inner dome having a solar energy absorbing surface,
    diffusing said water under pressure into said reservoir without disturbing water at the top of said reservoir,
    exposing said inner dome to solar radiation through a substantially transparent hemispherically shaped outer dome having a diameter larger than said inner dome and placed over said inner dome, and
    withdrawing heated water under said pressure from the top of said reservoir.

11. The solar heater and storage unit of claim 1 which additionally comprises a water expansion accumulator.

12. The solar heater and storage unit of claim 4 which additionally comprises a water expansion accumulator.

* * * * *